United States Patent
Park

(10) Patent No.: US 11,608,158 B1
(45) Date of Patent: Mar. 21, 2023

(54) NEGATIVE POISSON'S RATIO MATERIALS FOR PROPELLERS AND TURBINES

(71) Applicant: Joon Bu Park, Las Vegas, NV (US)

(72) Inventor: Joon Bu Park, Las Vegas, NV (US)

( * ) Notice: Subject to any disclaimer, the term of this patent is extended or adjusted under 35 U.S.C. 154(b) by 0 days.

(21) Appl. No.: 17/872,665

(22) Filed: Jul. 25, 2022

(51) Int. Cl.
*B64C 11/16* (2006.01)
*F01D 5/14* (2006.01)

(52) U.S. Cl.
CPC .............. *B64C 11/16* (2013.01); *F01D 5/14* (2013.01); *F05D 2300/60* (2013.01)

(58) Field of Classification Search
CPC . B63H 1/14; B63H 1/145; B63H 1/15; B63H 1/16; B63H 1/20; B63H 1/26; B63H 2001/165; B64C 11/00; B64C 11/001; B64C 11/02; B64C 11/20; F05B 2280/6003
See application file for complete search history.

(56) References Cited

U.S. PATENT DOCUMENTS

| | | | | |
|---|---|---|---|---|
| 9,494,206 | B2 * | 11/2016 | Rajasekaran | F16F 3/093 |
| 2012/0315456 | A1 * | 12/2012 | Scarpa | F16F 7/121 |
| | | | | 428/221 |
| 2018/0312239 | A1 * | 11/2018 | Vélez De Mendizábal Alonso | B64C 1/12 |
| 2019/0048737 | A1 * | 2/2019 | Geisen | F01D 11/16 |

FOREIGN PATENT DOCUMENTS

| | | |
|---|---|---|
| CN | 103116681 | 5/2013 |
| CN | 106021827 | 10/2016 |
| CN | 106499595 | 3/2017 |
| CN | 206419167 | 8/2017 |
| CN | 108105039 | 6/2018 |
| CN | 109210000 A * | 1/2019 ........... F04D 29/388 |
| CN | 109446683 | 3/2019 |
| CN | 10963 5414 | 4/2019 |
| CN | 109948218 | 6/2019 |
| CN | 110165929 | 8/2019 |
| CN | 110198833 | 9/2019 |

(Continued)

OTHER PUBLICATIONS

Wikipedia [online], "Propeller," available on or before Oct. 14, 2021, via Internet Archive: Wayback Machine URL <https://web.archive.org/web/20211014021736/https://en.wikipedia.org/wiki/Propeller>, retrieved on Oct. 18, 2022, URL <https://en.wikipedia.org/wiki/Propeller>, 16 pages.

(Continued)

*Primary Examiner* — Christopher R Legendre
(74) *Attorney, Agent, or Firm* — Fish & Richardson P.C.

(57) ABSTRACT

A propeller includes a rotatable hub and at least two propeller blades coupled to the rotatable hub. Each of the propeller blades is formed from a combination of a first material having a negative Poisson's ratio (NPR) and a second material having a positive Poisson's ratio (PPR). The first material and the second material can be layered or can be formed as a matrix with one of the first or second material embedded in the other. In a layered configuration, a layer of the first material is positioned between adjacent layers of the second material, and the layers can be connected by tabs of NPR material. The combination of the NPR and PPR materials improve the strength and impact resilience of the propeller blades compared to conventional materials.

19 Claims, 8 Drawing Sheets

(56) References Cited

FOREIGN PATENT DOCUMENTS

| CN | 108446483 | | | 4/2020 |
|----|-----------|----|---|--------|
| CN | 113719431 | | | 2/2022 |
| DE | 4122652 | A1 | * | 1/1992 |
| DK | 201270436 | | | 6/2013 |
| EP | 3706989 | | | 9/2020 |
| IN | 201721045082 | | | 4/2018 |
| JP | 2020133567 | A | * | 8/2020 |
| KR | 102222739 | B1 | * | 3/2021 |
| WO | WO 2012103891 | | | 9/2012 |
| WO | WO 2019081766 | | | 5/2019 |

OTHER PUBLICATIONS

Wikipedia [online], "Windmills," available on or before Dec. 15, 2021, via Internet Archive: Wayback Machine URL <https://web.archive.org/web/20211215094551/https://en.wikipedia.org/wiki/Windmill>, retrieved on Oct. 18, 2022, URL <https://en.wikipedia.org/wiki/Windmill>, 13 pages.

\* cited by examiner

NEGATIVE POISSON'S RATIO MATERIALS FOR PROPELLERS AND TURBINES

BACKGROUND

The present disclosure relates generally to materials for manufacture of propellers and turbines.

SUMMARY

We describe here a propeller formed from materials that exhibit a negative Poisson's ratio ("NPR materials"). NPR materials are durable and weigh less than traditional manufacturing materials (e.g., materials that exhibit a positive Poisson's ratio ("PPR materials")), and have an associated higher strength to weight ratio. A propeller formed from an NPR material has greater strength, flexibility, durability, and impact resistance than a propeller formed from conventional materials. Propellers can be formed from both NPR materials and PPR materials. This type of material that combines NPR and PPR materials is a composite material referred to as a Boolean-Park ("B-P") material.

Propellers typically have a rotating hub and blades with helical spiral pitch. Propellers can be used in applications that involve thrusting air (such as an airplane), thrusting water (such as a ship or boat propeller), or receiving air (such as a windmill, wind turbine, or wind power generator). Propellers are used in a variety of applications. In addition to uses on vehicles such as airplanes, ships, and boats, propellers or turbines are used in the production of electricity from wind or water. Propellers and turbines are also used in manufacturing processes for various chemicals and polymers. NPR materials in propellers and turbines can provide enhanced strength against impacts from debris compared to propellers or turbines made from traditional materials.

In an aspect, a propeller includes a rotatable hub and at least two propeller blades coupled to the rotatable hub. Each of the at least two propeller blades is formed at least in part from a first material having a negative Poisson's ratio and in part from a second material having a positive Poisson's ratio.

Embodiments can include one or any combination of two or more of the following features.

Each of the at least two propeller blades has a surface formed from a layered material having alternating layers of the first material having the negative Poisson's ratio and the second material having the positive Poisson's ratio.

Each layer of the layered material is coupled to an adjacent layer by a tab formed from the first material having the negative Poisson's ratio.

Each of the at least two propeller blades includes the first material having the negative Poisson's ratio embedded within a matrix of the second material having the positive Poisson's ratio.

Each of the at least two propeller blades includes the second material having the positive Poisson's ratio embedded within a matrix of the first material having the negative Poisson's ratio.

Each of the at least two propeller blades includes a surface formed from the first material having the negative Poisson's ratio and the second material having the positive Poisson's ratio.

Each of the at least two propeller blades includes a core formed from the first material having the negative Poisson's ratio and the second material having the positive Poisson's ratio.

The rotatable hub defines an axis of rotation, and the at least two propeller blades are coupled to the rotatable hub substantially perpendicular to the axis of rotation.

Each of the at least two propeller blades includes a leading edge, a trailing edge, a forward surface extending from the leading edge to the trailing edge, and a rear surface extending from the leading edge to the trailing edge, and the forward surface is substantially parallel to the rear surface.

The forward surface and the rear surface converge at the leading edge to form a sharp leading edge and converge at the trailing edge to form a sharp trailing edge.

At least one of the trailing edge and the leading edge is formed from the first material having the negative Poisson's ratio.

At least one of the trailing edge and the leading edge is formed at least in part from the first material having the negative Poisson's ratio and in part from the second material having the positive Poisson's ratio.

The rotatable hub is formed at least in part from the first material having a negative Poisson's ratio.

The rotatable hub is formed at least in part from the second material having the positive Poisson's ratio.

The first material having a negative Poisson's ratio includes an NPR foam, ceramic or metal.

In another aspect, a propeller blade includes a leading edge, a trailing edge, a forward surface extending from the leading edge to the trailing edge, and a rear surface extending from the leading edge to the trailing edge, and the forward surface is substantially parallel to the rear surface. The forward surface is substantially parallel to the rear surface and the propeller blade is formed at least in part from a first material having a negative Poisson's ratio and in part from a second material having a positive Poisson's ratio.

Embodiments can include one or any combination of two or more of the following features.

A length of the forward surface from the leading edge to the trailing edge is increased during rotation.

The propeller blade includes the second material having the positive Poisson's ratio embedded within a matrix of the first material having the negative Poisson's ratio.

The propeller blade includes a layered material having alternating layers of the first material having the negative Poisson's ratio and the second material having the positive Poisson's ratio.

Each layer is coupled to an adjacent layer by tabs formed from the first material having the negative Poisson's ratio.

Other embodiments are within the scope of the claims.

DETAILED DESCRIPTION

We describe here materials that exhibit a negative Poisson's ratio (i.e., NPR materials). NPR materials are durable and may weigh less than traditional manufacturing materials, and have an associated higher strength to weight ratio. NPR materials have structures that can absorb energy from impacts and provide enhanced durability to withstand impacts without damage. NPR materials in propellers and turbines can provide enhanced strength and resilience compared to propellers and turbines made from traditional materials, and can absorb energy from impacts. Propellers and turbines that incorporate NPR materials can also operate more efficiently, because the materials weigh less than PPR materials.

Figure 1:
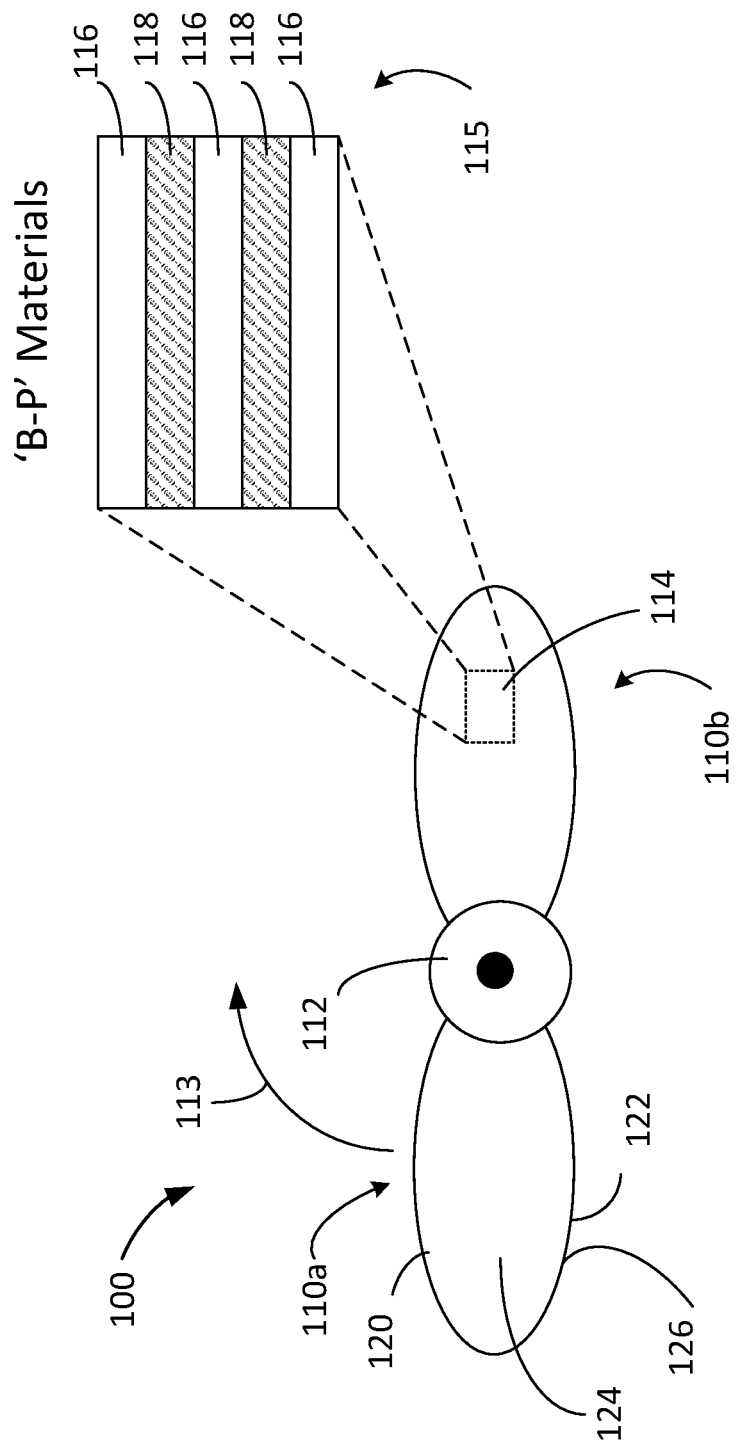
FIG. 1 is an illustration of a propeller.

Referring to FIG. 1, a propeller 100 has a rotating hub 112, a first blade 110a, and second blade 110b. The rotating hub 112 defines an axis of rotation (into the page) about which the blades 110a and 110b rotate in a direction 113. The first and second blades 110a, 110b can be arranged with respect to the rotating hub 112 with a helical spiral pitch. The first blade 110a has a leading edge 120, a trailing edge 122, a forward surface 124 extending from the leading edge 120 to the trailing edge 122, and a rear surface 126 extending from the leading edge 120 to the trailing edge 122. The forward surface 124 is substantially parallel to the rear surface 126. The forward surface 124 and rear surface 126 can converge at the leading edge 120 and trailing edge 122 such that the edges are pointed or sharp. Alternatively, one or both of the leading edge 120 and the trailing edge 122 can be formed as a curved surface between the forward surface 124 and the rear surface 126. These edges and surfaces are illustrated only on the first blade 110a for clarity, the second blade 110b has the same edges and surfaces.

The first and second blades 110a, 110b are formed using negative Poisson's ratio ("NPR") materials. In some implementations, the blades 110a, 110b are formed entirely of NPR material. In some implementations, NPR materials can be combined with PPR materials to form "Boolean-Park" materials ("B-P" materials), as shown in a cross-section 115 of a section 114 the second blade 110b illustrated in FIG. 1. As shown in the cross-section 115, the blade 110b can include alternating layers of NPR materials 116 and positive Poisson's ratio ("PPR") materials 118. The NPR materials can be created by arranging nano- or micro-spheres or sponges of PPR material in a particular configuration so that the spheres or sponges behave as NPR materials. NPR materials can also be created by folding or cutting PPR materials.

In some implementations, the first and second blades 110a, 110b incorporate an NPR material 116 in combination with a PPR material 118 (e.g., a B-P material). The portion of the first and second blades 110a and 110b which is not formed from a B-P material can be entirely NPR material or entirely PPR material. In some implementations, a surface of the first and second blades 110a, 110b is formed from a B-P material. In some implementations, the trailing edge 122 and/or the leading edge 120 includes a NPR material. In some implementations, the trailing edge 122 and/or the leading edge 120 includes a B-P material. A B-P material positioned at the leading edge 120 may provide enhanced strength and resistance to damage to the leading edge 120 of the blade due from debris impact during rotation. Alternatively or additionally, in some implementations, a core of the first and second blades 110a, 110b is formed from a B-P material. In some implementations, the Poisson's ratio of the core of the first and second blades 110a, 110b is constant throughout a length of the blade from the connection at the hub to the blade tip. In some implementations, the Poisson's ratio of the core of the first and second blades 110a, 110b changes across the length of the blade, for example, by changing a ratio of NPR material to PPR materials in the composite.

In some implementations, the B-P material is used in only a portion of the propeller blades, and is composited with other NPR or PPR materials. For example, in some implementations, one or more braces or struts of the first and second blades 110a, 110b are formed from a B-P material. Other portions of the propeller blades, such as a surface or a core can be formed from a PPR material, an NPR material, or a B-P material different than the material of the braces or struts. In some implementations, all or a portion of the rotatable hub 112 also includes a B-P material. In some implementations, the blades of the propeller are formed as shells with a hollow core. In some implementations, at least part of the shell is formed from a B-P material.

B-P materials provide strength to the propeller 100 and/or propeller blades 110a and 110b formed from the materials. In some implementations, the B-P material forming the propeller blades 110a, 110b can include five layers of NPR 116 and PPR 118 materials (e.g., three layers of NPR materials 116 and two layers of PPR materials 118, or three layers of PPR materials 118 and two layers of NPR materials 116). In some implementations, the B-P material forming the propeller blades 110a, 110b can include two or more layers of PPR materials 118 and more layers of NPR materials 116 (e.g., three layers of PPR materials 118 and four layers of NPR material 116, with one layer of NPR material 116 disposed between each two adjacent layers of PPR materials 118). In some implementations, the B-P material forming the propeller blades 110a, 110b include 10, 20, 25, 50, 100, 250, or 500 layers of materials. In some implementations, the B-P material forming the propeller blades 110a, 110b can include more layers of NPR material 118 than PPR materials 116. In some implementations, the B-P material forming the propeller blades 110a, 110b can include more layers of PPR materials 118 than of NPR materials 116.

While two blades (first blade 110a and second blade 110b) are shown in FIG. 1 for clarity, the propeller 100 can include a single blade or more than two blades. For example, the propeller 100 can include three, four, five, six, eight, ten blades or more. In some implementations, at least one blade of the propeller has a mechanical property different than another blade of the propeller based on differences in the ratio of NPR material to PPR materials in the composite in the blades.

Propellers can be used in devices that operate by thrusting air (for example, airplanes), or water (for example, ships). Propellers can also be used in devices that receive air, such as a windmill, turbine, or power generator, or in devices for manufacturing and processing. Propellers formed from B-P materials can be lighter than propellers formed from PPR materials because of the porous structure of the NPR materials in the propeller blade or hub. In some implementations, one or more dimensions of the propeller blade may change during rotation as a result of the forces on the B-P materials of the propeller blade. For example, a width of a blade from the leading edge to the trailing edge may be elongated during rotation.

As a propeller is rotated in air, water, or another substance, the blades are vulnerable to damage by debris in the air or water hitting the rotating blades. B-P materials can provide protection against damage from debris, and may even absorb energy from debris that impacts the propeller blade. In some implementations, one or more cutting mechanisms are attached to the propeller blade to provide further protection from debris impacting the propeller blades or inhibiting motion of the propeller. In some implementations, the B-P material propeller blade is used in a device designed for energy transfer. In some implementations, the B-P material propeller blade is used in a windmill. In some implementations, the B-P material propeller blade is used in a device designed as a renewable energy source.

B-P materials have a lower density, better strength to weight ratio, greater porosity, larger surface area, and better dimensional stability than conventional materials. Further, the use of B-P materials in production of propellers is more efficient than use of conventional materials because a smaller amount of material can be used in the manufacturing process.

NPR materials have material characteristics and behaviors that are different from (e.g., the opposite of) those of PPR materials under application of mechanical, electromagnetic, light, thermal, and energy forces. An object with a negative Poisson's ratio is an object that has a Poisson's ratio that is less than zero, such that when the object experiences a positive strain along one axis (e.g., when the object is stretched), the strain in the object along the two perpendicular axes is also positive (e.g., the object expands in cross-section). Conversely, when the object experiences a negative strain along one axis (e.g., when the object is compressed), the strain in the object along a perpendicular axis is also negative (e.g., the object compresses along the perpendicular axis). By contrast, an object with a positive Poisson's ratio (PPR) has a Poisson's ratio that is greater than zero. When an object with a PPR experiences a positive strain along one axis (e.g., when the object is stretched), the strain in the object along the two perpendicular axes is negative (e.g., the object compresses in cross-section), and vice versa. Because of the NPR material behavior, the use of B-P materials can provide more reliable connections between sheets or rods used in the production of the propeller, improving the longevity and design of the propeller and decreasing costs related to upkeep or replacement of propeller components.

Figure 2A:
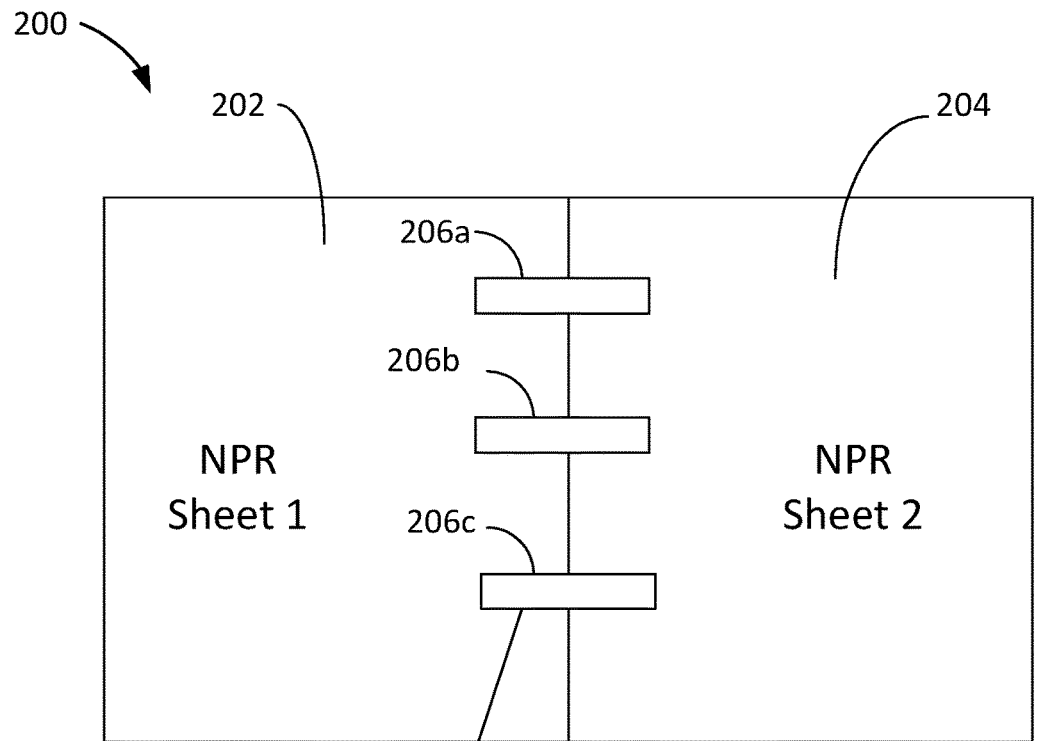
FIGS. 2A-2C are illustrations of methods for coupling sheets of materials with negative and positive Poisson's ratios.
Figure 2B:
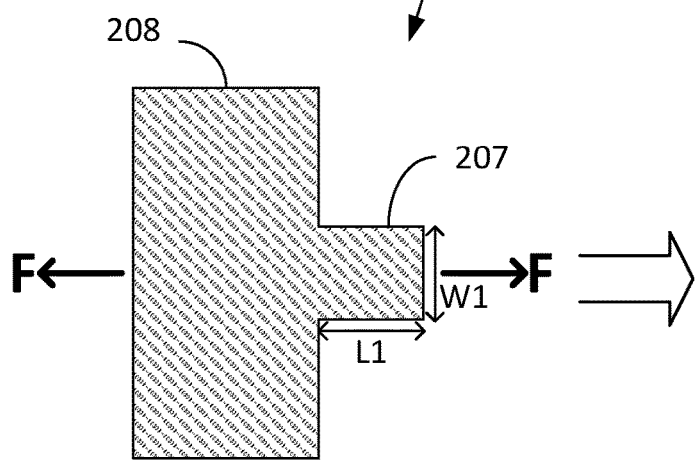
Figure 2C:
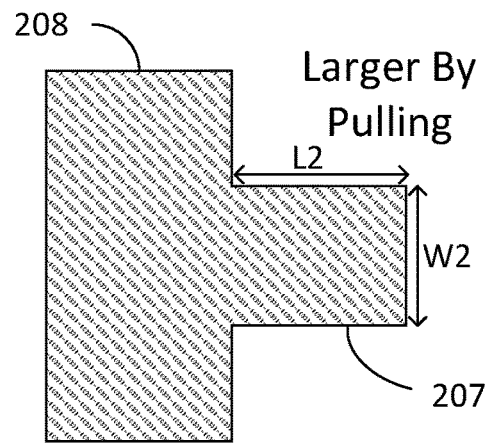

Referring to FIGS. 2A-2C, a mechanism for coupling B-P materials to form a propeller is illustrated. FIG. 2A illustrates a first NPR sheet 202, a second NPR sheet 204, and NPR tabs 206a-c. The first NPR sheet 202 is coupled to the second NPR sheet 204 using tabs 206a-c. The tabs 206a-c may be connected to the first NPR sheet 202 or the second NPR sheet 204. FIGS. 2B and 2C show a tab 207 coupled to the first NPR sheet 208. FIG. 2B shows the tab 207 having a length L1 and a width W1. When opposing forces ("F") are applied to pull the tab 207 away from the first NPR sheet 208, the width W1 and length L1 are altered. FIG. 2C illustrates the behavior of the NPR material in reaction of the applied forces. The tab 207, having length L2 and width W2, is made larger (e.g., L2 is greater than L1 and W2 is greater than W1) by the application of forces to pull the tab 207 away from the first NPR sheet 208. Coupling one or more NPR sheets or other components to one another by the use of tabs can provide a secure connection mechanism, because forces that could separate components formed from traditional materials will instead reinforce the connection of NPR materials as illustrated in FIGS. 2B and 2C. NPR sheets can be coupled together with tabs to form a surface or core of the propeller blade. Additionally or alternatively, NPR sheets can be coupled with tabs to form layers with PPR sheets to form a composite material for use in a propeller blade core or surface.

The NPR material used for the propeller can be a ceramic, metal, polymer, foam or composite material. The NPR material used for the propeller can be an NPR polymer foam, such as a foam of polymethylmethacrylate (PMMA), polystyrene, polycarbonate, thermoplastic polymer foam (e.g., polyester polyurethane or polyether polyurethane), viscoelastic elastomer foam, or other suitable polymers. The NPR material can have a Poisson's ratio of between −1 and 0, e.g., between −0.8 and 0, e.g., −0.8, −0.7, −0.6, −0.5, −0.4, −0.3, −0.2, or −0.1. The NPR material can have an isotropic Poisson's ratio (e.g., Poisson's ratio is the same in all directions) or an anisotropic Poisson's ratio (e.g., Poisson's ratio when the material is strained in one direction differs from Poisson's ratio when the material is strained in a different direction).

As described above, in some examples, components of the propeller are formed of an NPR composite material that includes both an NPR material and a PPR material, e.g., alternating layers of NPR material and PPR material (as illustrated in FIG. 1), or a matrix of PPR material with NPR material embedded therein, or a matrix of NPR material with PPR material embedded therein. In some implementations, the B-P material, including both NPR and PPR materials, can be additively manufactured, e.g., by 3-D printing.

NPR materials have a lower density than PPR materials, e.g., than PPR materials of a similar composition or than PPR materials having similar mechanical properties, and propellers including NPR materials can thus be lighter in weight and use less material than similar objects formed of PPR materials.

The characteristics of the NPR material can be selected based on the desired characteristics of the propeller (e.g., size, strength, flexibility). For instance, when an NPR-PPR composite is used in the manufacture of the propeller, the relative sizes of the NPR and PPR portions of the composite (e.g., the number and thickness of the layers for a layered composite, the size or number density of the inclusions for a matrix composite, the volume or weight percentage of NPR versus PPR materials in the composite, the composition of the NPR and PPR materials) can be selected to provide a desired flexibility of the propeller or propeller surface, a desired strength, a desired weight, or any other desired characteristic.

Figure 3:
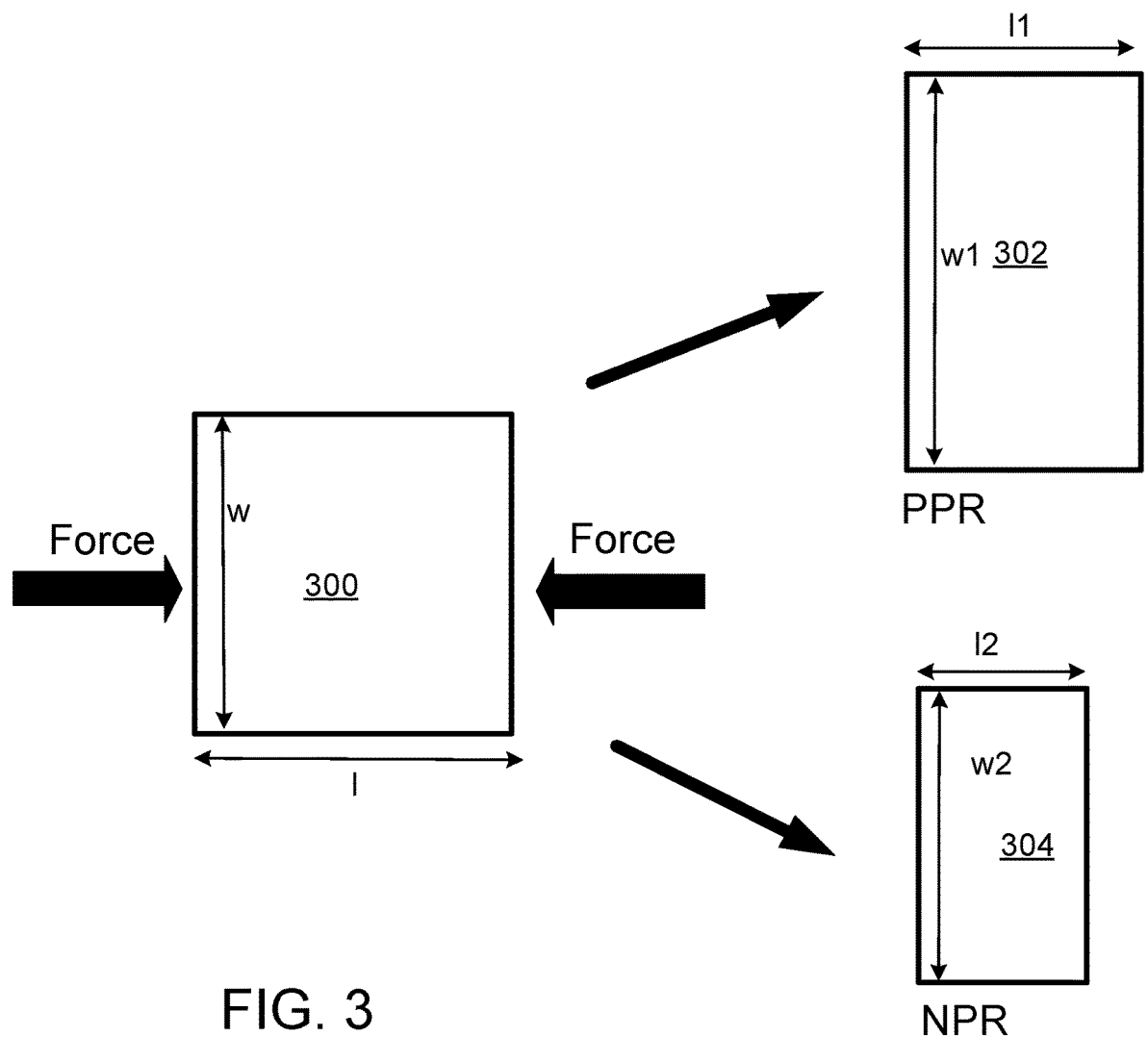
FIG. 3 is an illustration of materials with negative and positive Poisson's ratios.

Materials with negative and positive Poisson's ratios are illustrated in FIG. 3, which depicts a hypothetical two-dimensional block of material 300 with length 1 and width w.

If the hypothetical block of material 300 is a PPR material, when the block of material 300 is compressed along its width w, the material deforms into the shape shown as block 302. The width w1 of block 302 is less than the width w of block 300, and the length l1 of block 302 is greater than the length 1 of block 300: the material compresses along its width and expands along its length.

By contrast, if the hypothetical block of material 300 is an NPR material, when the block of material 300 is compressed along its width w, the material deforms into the shape shown as block 304. Both the width w2 and the length l2 of block 304 are less than the width w and length 1, respectively, of block 300: the material compresses along both its width and its length.

NPR materials for insulators can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that an item that includes an NPR material undergoes a different (e.g., smaller) change in dimension when absorbing energy than a comparable item formed of only PPR material.

Figure 4:
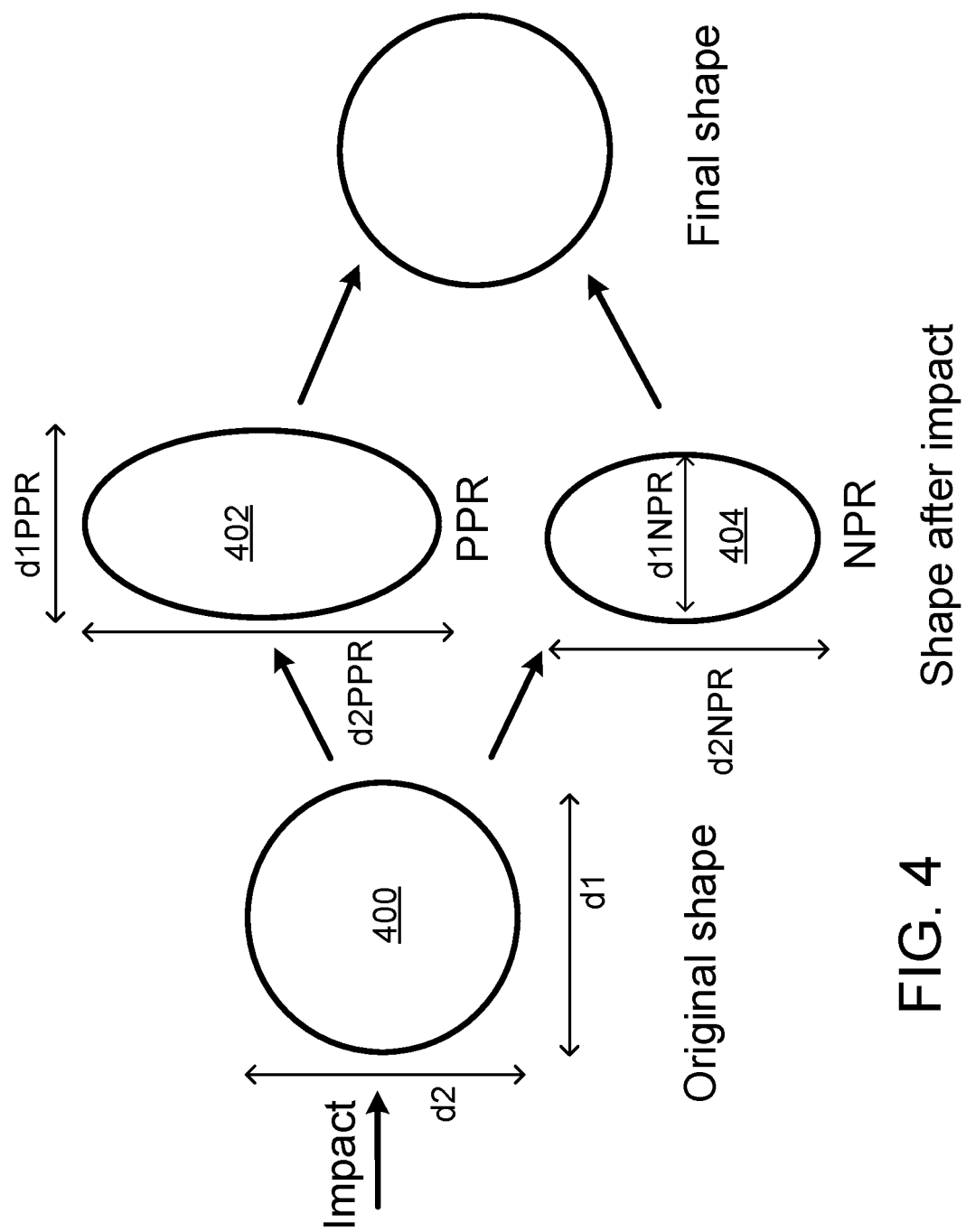
FIG. 4 is an illustration of balls with negative and positive Poisson's ratios.
Figure 6:
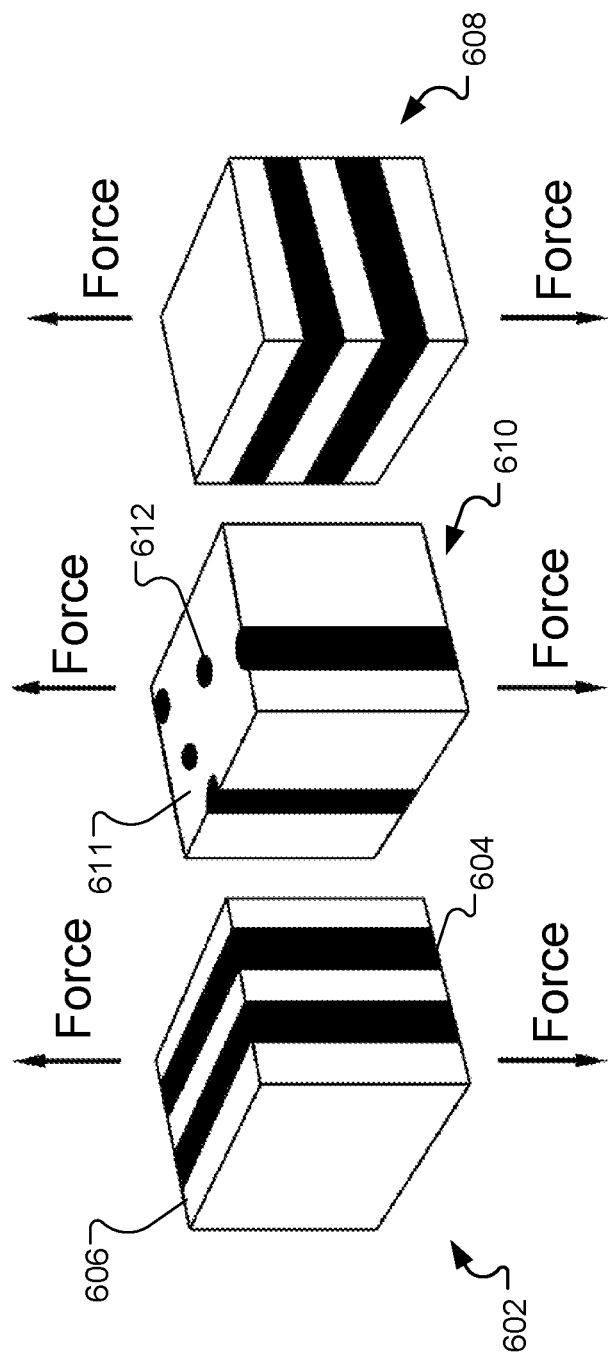
FIG. 6 is an illustration of composite materials.

FIG. 4 shows a schematic depiction of the change in diameter of a material 400 upon impact. Although the material 400 in FIG. 6 is shown as a rounded ball, a similar deformation occurs in materials of other shapes. Prior to impact, the material 400 has a diameter d1 in the direction of the impact and a diameter d2 in the direction perpendicular to the impact. If the material 400 is a PPR material, the material undergoes significant deformation (e.g., elastic deformation) into a shape 402, such that the diameter in the direction of the impact decreases to d1PPR and the diameter in the direction perpendicular to the impact increases to d2PPR. By contrast, if the material 400 is an NPR material, the material undergoes less extensive deformation into a shape 404. The diameter of the shape 404 in the direction of the impact decreases to d1NPR, which is approximately the same as d1PPR. However, the diameter of the shape 404 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 5A:
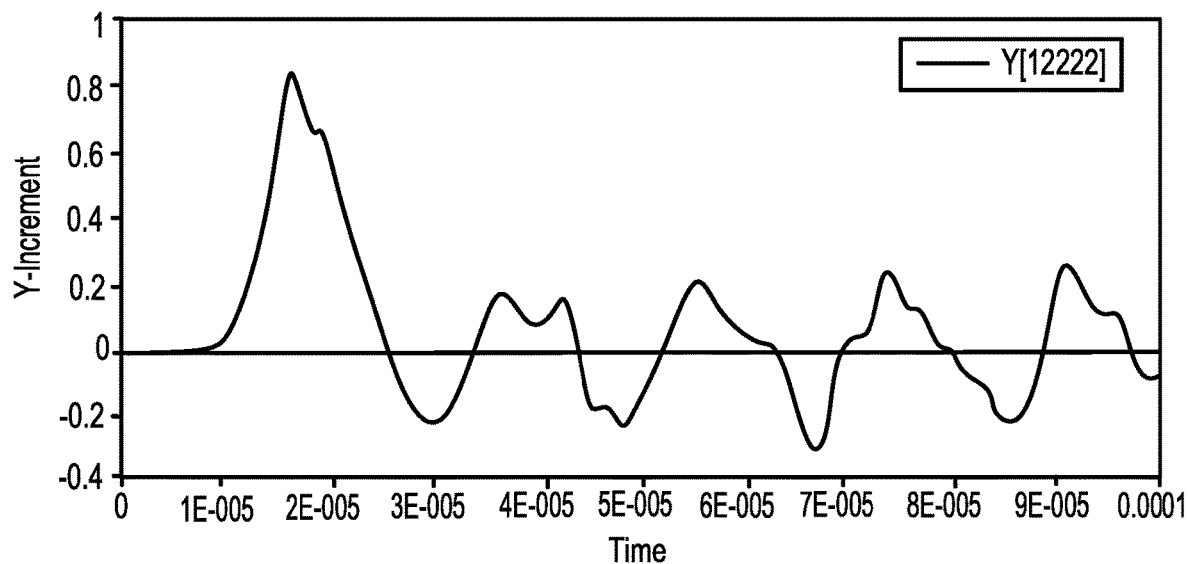
FIGS. 5A and 5B are plots of diameter versus time.
Figure 5B:
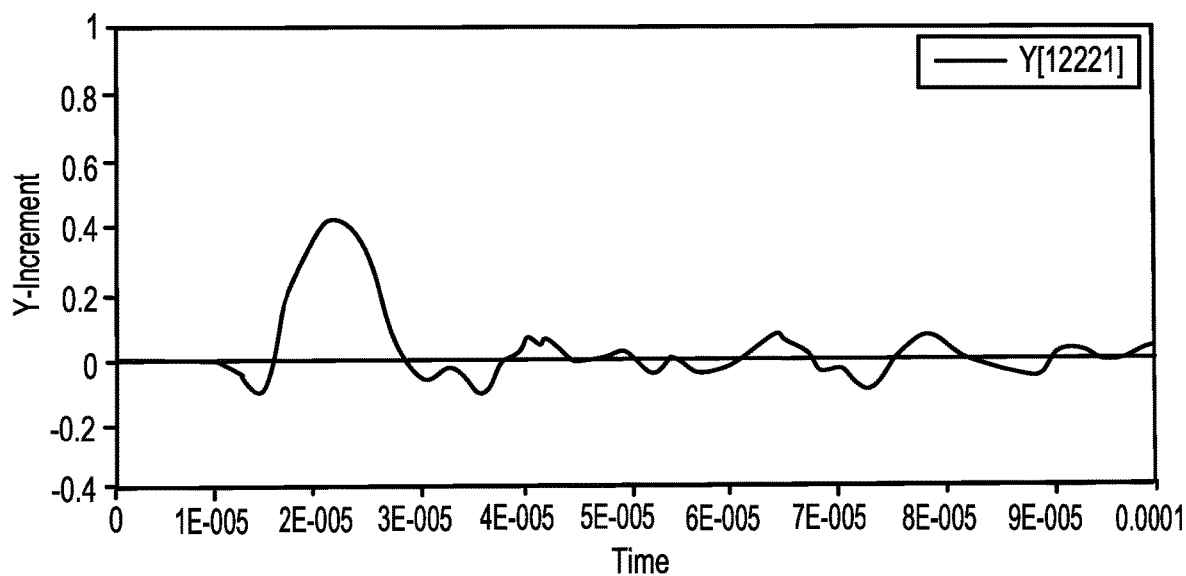

FIGS. 5A and 5B show plots of diameter versus time for a substantially spherical PPR material with a Poisson's ratio of 0.45 and an NPR material with a Poisson's ratio of −0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 5A and 5B are specific to substantially spherical materials, a similar behavior occurs in NPR and PPR materials of other shapes. The material of an insulator can be selected to balance rigidity and elasticity.

FIG. 6 illustrates examples of NPR-PPR composite materials. An NPR-PPR composite material 602 is a laminar composite including alternating layers 604 of NPR material and layers 605 of PPR material. The layers 604, 606 are arranged in parallel to a force to be exerted on the composite material 602. Although the layers 604, 606 are shown as having equal width, in some examples, a laminar composite can have layers of different widths.

An NPR-PPR composite material 608 is a laminar composite including alternating layers of NPR material and PPR material, with the layers arranged perpendicular to a force to be exerted on the material 608. In some examples, the layers of a laminar composite are arranged at an angle to the expected force that is neither perpendicular nor parallel.

An NPR-PPR composite material 612 is a matrix composite including a matrix phase 611 of NPR material with a reinforcement phase 612 of PPR material. In the material 612, the reinforcement phase 612 includes fibers of the PPR material; in some examples, the reinforcement phase 612 can include particles or other configuration. In some examples, NPR-PPR composite materials can have a matrix phase of a PPR material with a reinforcement phase of an NPR material.

Figure 7:
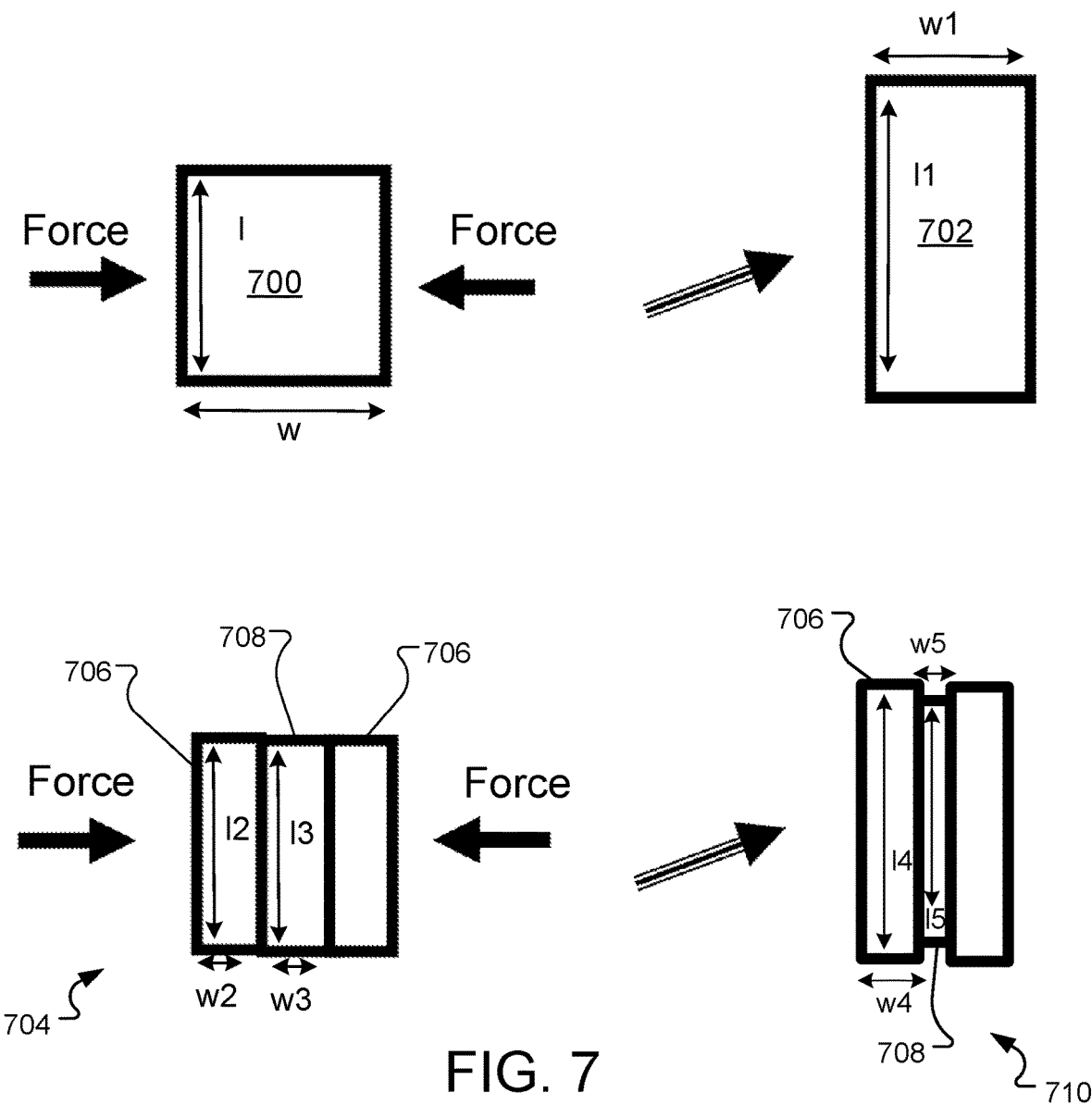
FIG. 7 is an illustration of a material with a positive Poisson's ratio and a composite material.

FIG. 7 illustrates the mechanical behavior of PPR and NPR/PPR composite materials. A hypothetical block 700 of PPR material, when compressed along its width w, deforms into a shape 702. The width w1 of the compressed block 702 is less than the width w of the uncompressed block 700, and the length l1 of the compressed block 702 is greater than the length l of the uncompressed block: the material compresses along the axis to which the compressive force is applied and expands along a perpendicular axis.

A block 704 of NPR/PPR composite material includes a region 708 of NPR material sandwiched between two regions 706 of PPR material. When the block 704 of composite material is compressed along its width, the material deforms into a shape 710. The PPR regions 706 compress along the axis of compression and expand along a perpendicular axis, e.g., as described above for the block 700 of PPR material, such that, e.g., the width w2 of a region 706 of uncompressed PPR material compresses to a smaller width w4 and the length l2 of the region 706 expands to a greater length l4. In contrast, the NPR region 708 compresses along both the axis of compression and along the perpendicular axis, such that, e.g., both the width w3 and length l3 of the uncompressed NPR region 708 are greater than the width w5 and length l5 of the compressed NPR region 708.

Figure 8:
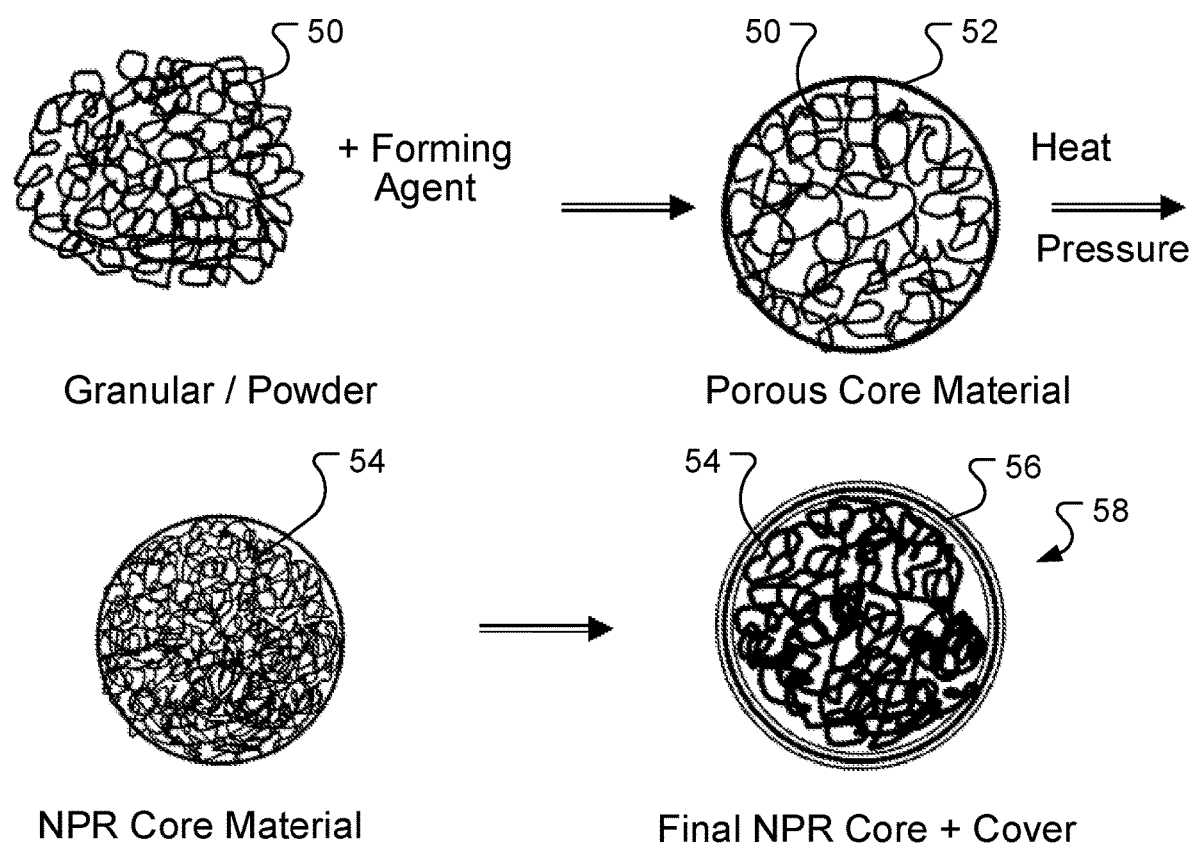
FIG. 8 is an illustration of a method of making an NPR material.

FIG. 8 illustrates an example method of making an object, such as casing, window, or other object, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, an inner layer may be 3D printed while the out layer is not, or vice versa. Additive manufacturing techniques can enable seams to be eliminated.

In accordance with the implementations of this disclosure, propellers and propeller blades that include NPR and/or B-P materials are described. Propeller blades and propellers can incorporate NPR materials in all or part of the blade surface, core, braces and struts, or hub. Propeller blades and propellers incorporating NPR and B-P materials have enhanced strength, durability, flexibility and impact resistance compared to propellers formed entirely from PPR materials. Further, propeller blades and propellers incorporating NPR materials may be lighter in weight compared to conventional materials due to the porosity of NPR materials. The higher strength to weight ratio can improve the efficiency of operation of the propeller relative to PPR material propellers. Propellers made with NPR materials in combination with PPR materials (e.g., B-P materials) can be used in a variety of devices, including airplanes, boats, windmills, wind or water turbines, and chemical processing turbines.

Other embodiments are within the scope of the following claims.

What is claimed is:

1. A propeller comprising:
   a rotatable hub; and
   at least two propeller blades coupled to the rotatable hub, each of the at least two propeller blades is formed in part from a first material having a negative Poisson's ratio and in part from a second material having a positive Poisson's ratio, each of the at least two propeller blades comprising a first surface formed from a layered material having alternating layers of the first material having the negative Poisson's ratio and the second material having the positive Poisson's ratio.

2. The propeller of claim 1, wherein each layer of the layered material is coupled to an adjacent layer by a tab formed from the first material having the negative Poisson's ratio.

3. The propeller of claim 1, wherein each of the at least two propeller blades comprises a second surface formed from the first material having the negative Poisson's ratio and the second material having the positive Poisson's ratio.

4. The propeller of claim 1, wherein each of the at least two propeller blades comprises a core formed from the first material having the negative Poisson's ratio and the second material having the positive Poisson's ratio.

5. The propeller of claim 1, wherein the rotatable hub defines an axis of rotation, and the at least two propeller blades are coupled to the rotatable hub substantially perpendicular to the axis of rotation.

6. The propeller of claim 1, wherein each of the at least two propeller blades comprises:
   a leading edge;
   a trailing edge;
   a forward surface extending from the leading edge to the trailing edge; and
   a rear surface extending from the leading edge to the trailing edge,
   wherein the forward surface is substantially parallel to the rear surface.

7. The propeller of claim 6, wherein the forward surface and the rear surface converge at the leading edge to form a sharp leading edge and converge at the trailing edge to form a sharp trailing edge.

8. The propeller of claim 6, wherein at least one of the trailing edge and the leading edge is formed from the first material having the negative Poisson's ratio.

9. The propeller of claim 6, wherein at least one of the trailing edge and the leading edge is formed at least in part from the first material having the negative Poisson's ratio and in part from the second material having the positive Poisson's ratio.

10. The propeller of claim 1, wherein the rotatable hub is formed from at least one of the first material having the negative Poisson's ratio and the second material having the positive Poisson's ratio.

11. The propeller of claim 1, wherein the first material having a negative Poisson's ratio comprises an NPR metal, ceramic, or foam.

12. A propeller blade, comprising:
a leading edge;
a trailing edge;
a forward surface extending from the leading edge to the trailing edge; and
a rear surface extending from the leading edge to the trailing edge,
wherein the forward surface is substantially parallel to the rear surface, and
wherein the propeller blade is formed in part from a first material having a negative Poisson's ratio and in part from a second material having a positive Poisson's ratio, and the propeller blade comprises a matrix of the first material having the negative Poisson's ratio with the second material having the positive Poisson's ratio embedded in the matrix.

13. The propeller blade of claim 12, wherein a length of the forward surface from the leading edge to the trailing edge is increased during rotation of a propeller including the propeller blade.

14. A propeller blade, comprising:
a leading edge;
a trailing edge;
a forward surface extending from the leading edge to the trailing edge; and
a rear surface extending from the leading edge to the trailing edge,
wherein the forward surface is substantially parallel to the rear surface,
wherein the propeller blade is formed in part from a first material having a negative Poisson's ratio and in part from a second material having a positive Poisson's ratio, and
wherein the propeller blade comprises a layered material having alternating layers of the first material having the negative Poisson's ratio and the second material having the positive Poisson's ratio.

15. The propeller blade of claim 14, wherein each layer is coupled to an adjacent layer by a plurality of tabs formed from the first material having the negative Poisson's ratio.

16. A propeller comprising:
a rotatable hub; and
at least two propeller blades coupled to the rotatable hub, each of the at least two propeller blades is formed in part from a first material having a negative Poisson's ratio and in part from a second material having a positive Poisson's ratio, each of the at least two propeller blades comprising a matrix of the second material having the positive Poisson's ratio with the first material having the negative Poisson's ratio embedded in the matrix.

17. The propeller of claim 16, wherein each of the at least two propeller blades comprises a core formed from the first material having the negative Poisson's ratio and the second material having the positive Poisson's ratio.

18. A propeller comprising:
a rotatable hub; and
at least two propeller blades coupled to the rotatable hub, each of the at least two propeller blades is formed in part from a first material having a negative Poisson's ratio and in part from a second material having a positive Poisson's ratio, each of the at least two propeller blades comprising a matrix of the first material having the negative Poisson's ratio with the second material having the positive Poisson's ratio embedded in the matrix.

19. The propeller of claim 18, wherein each of the at least two propeller blades comprises a core formed from the first material having the negative Poisson's ratio and the second material having the positive Poisson's ratio.

* * * * *